United States Patent [19]

Moriguchi et al.

[11] 4,451,853

[45] May 29, 1984

[54] IMAGE DATA TRANSMISSION PROCESS

[75] Inventors: Harukiko Moriguchi; Masami Kurata; Takashi Ohmori, all of Kanagawa, Japan

[73] Assignee: Fuji Xerox Co., Ltd., Kanagawa, Japan

[21] Appl. No.: 349,106

[22] Filed: Feb. 16, 1982

[30] Foreign Application Priority Data

Feb. 20, 1981 [JP] Japan ................................ 56-23138

[51] Int. Cl.³ .............................................. H04N 1/40
[52] U.S. Cl. ................................ 358/281; 340/310 A; 455/3
[58] Field of Search .................... 358/256, 86, 281; 455/3; 340/310 R, 310 A

[56] References Cited

U.S. PATENT DOCUMENTS 4,057,793 11/1977 Johnson et al. ................. 340/310 R Primary Examiner—John C. Martin
Assistant Examiner—Edward L. Coles
Attorney, Agent, or Firm—Sughrue, Mion, Zinn, Macpeak and Seas

[57] ABSTRACT

The invention relates to an image transmission process such as facsimile transmission wherein image data is converted into an electrical signal, transmitted over lines and then converted into a recorded image at the receiving end. Specifically, the invention concerns a process wherein conventional commercial electric power lines are used as the transmission line, such that facsimile or other image transmission may be easily effected within, for example, a single building or similarly limited area.

1 Claim, 3 Drawing Figures

IMAGE DATA TRANSMISSION PROCESS

BACKGROUND OF THE INVENTION

The present invention relates to a transmission process for transmitting image date upon converting it into an electrical signal. More specifically, the invention relates to an image data transmission process enabling easy transmission of image date from place to place within the same building or within the same area where the transmission end is located.

Recently, attention has been drawn to facsimile systems capable of reproducing still images by utilizing communication techniques. A transmission device of such a facsimile system produces, upon scanning an image, an electrical signal (image signal) corresponding to the density of the still image. The image signal thus produced is, directly, or after being stored in a memory device, transmitted to a receiving device to form a recorded image. The transmission of the image signal is usually effected through a telephone line. However, it is also possible to effect image transmission through a private, exclusive line made of, for example, optical fibers, used in a building or in a limited area.

The conventional facsimile system requires a signal line, as described above, between the transmission end and the receiving end. Therefore, in order to use the facsimile system in a place where no telephone lines or private lines exist, it has been necessary to install such lines. Even in places where such lines are in existence, the use of a facsimile system is often inconvenient because the locations of the transmission and receiving devices are restricted in relation to the location of the signal lines.

SUMMARY OF THE INVENTION

Accordingly, an object of this invention is to provide an image data transmission process which enables the transmission of image data from place to place within a building or a limited area.

According to the invention, the foregoing object is achieved by converting the image data into an electric signal having a carrier frequency different from a commercial frequency on an electric power transmission line, and transmitting the electric signal thus converted through the electric power transmission line.

DESCRIPTION OF THE PREFERRED EMBODIMENT

A preferred embodiment of this invention will now be described with reference to the accompanying drawings.

Figure 1:
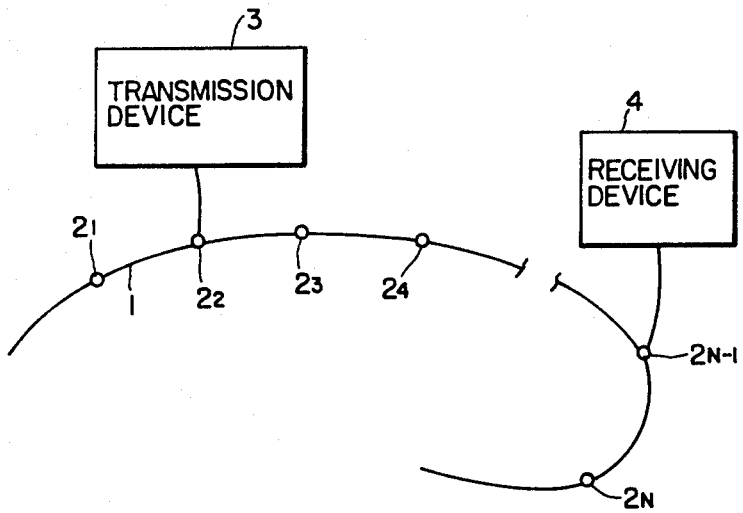
FIG. 1 is an explanatory diagram for describing the image data transmission process according to the invention.

FIG. 1 is an explanatory diagram for describing an image data transmission process taking place within a building. Along an electric power transmission line 1 distributed throughout a building, there are provided a number of plug sockets $2_1$ through $2_N$. In order to effect transmission of image data between two particular locations within the building, transmission and receiving devices are connected to the plug sockets located nearest to the positions where these devices are set. In FIG. 1, the transmission device 3 is connected to a plug socket $2_2$ and the receiving device 4 to the plug socket $2_{N-1}$. The transmission device 3 is supplied from the plug socket $2_1$ with the electrical energy necessary to implement its operation. When image transmission is started, am image signal is outputted from the transmission device 3 through the electric power transmission line 1. The image signal is superposed on the AC commercial voltage, and then transmitted to the receiving device 4. While being supplied through the plug socket $2_{N-1}$ with the electrical energy necessary to implement the operation of the receiving device 4, the latter device 4 receives the image signal being transmitted and produces a recorded image.

Figure 2:
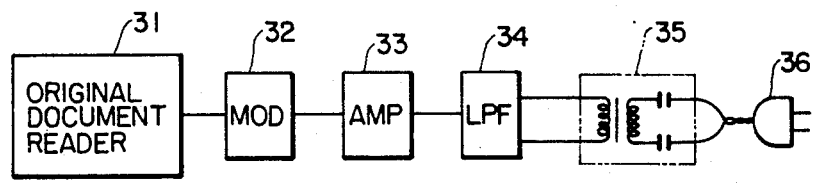
FIG. 2 is a block diagram showing the essential portions of the transmission device of the invention.

FIG. 2 is a circuit diagram, in block form showing the essential portions of the transmission device 3, for implementing the transmission of the image. An original document reader 31 in the transmission device 3 reads out binary image data represented by black and white areas of an original document with a maximum bit rate of 120 kbps. The binary image data is applied to a modulator 32 where it is subjected to FS (frequency shift) modulation with frequencies of 300 KHz and 400 KHz. The image signal, after being modulated, is applied to an amplifier 33 where it is amplified to have a 10 mW transmission output. The image signal, after being amplified, is passed through a lowpass filter 34 having a cut-off frequency of 450 KHz. The lowpass filter 34 operates to restrict the frequency range of the image signal to be transmitted through the transmission line, which has a transmission frequency band of 10 KHz to 450 KHz. The image signal passed through the filter 34 is fed out from the plug socket $2_2$ through an electric line coupling portion 35 and an attachment plug 36.

Figure 3:
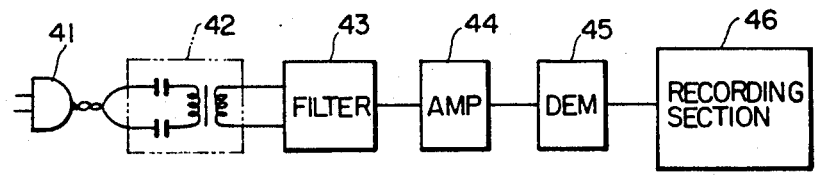
FIG. 3 is a block diagram showing the essential portions of a receiving device of the invention.

FIG. 3 is a circuit diagram block diagram showing the portions of the receiving device which are essential for reception of the image data. An attachment plug 41 is coupled to the plug socket $2_{N-1}$ so as to be connected to the transmission line. An electric power coupling portion 42 detects the image signal which has been subjected to FS modulation and applies it to a filter 43 which serves to cut out unnecessary frequency components. Thereafter, the image signal is amplified by an amplifier 44 and then demodulated by a demodulator 45 into binary image data representation of whites and blacks. The image signal thus demodulated is applied to a recording section 46 where the reproduced image is formed.

As described above, according to the invention, since the image data which has been converted into an electric signal is transmitted, for example, through the electric power transmission line provided in individual buildings on houses by way of an electric power line carrying process as conventionally utilized in an intercom etc., it is economically advantageous because exclusive signal lines, made of, for example, optical fibers, need not be installed.

Although the invention has been described with respect to an image data transmission process such as facsimile transmission for example, it would be noted that the present invention is also applicable to any kind of image data transmitting device as long as image data is transmitted upon converting it into electric signals.

What is claimed is:

1. A method for transmitting image information within a building, comprising the steps of:

scanning a document to be transmitted and producing a binary signal indicative of image information contained on said document;

producing a modulation signal in response to said binary signal, said modulation signal having a frequency of substantially 300 KHz for a first state of said binary signal and a frequency of 400 KHz for a second state of said binary signal;

amplifying said modulation signal to a power of 10 mW;

low-pass filtering the amplified modulation signal with a cut-off frequency of 450 KHz;

coupling the filtered and amplified modulation signal to an electrical power transmission line in said building at a first location;

at a second location in said building, coupling said electric power transmission line to a second filter;

amplifying an output of said second filter;

demodulating the amplified filtered signal received from said electric power transmission line at said second location; and producing a recorded image in response to the demodulated signal.

* * * * *